United States Patent
Ganesan

(10) Patent No.: US 9,712,519 B2
(45) Date of Patent: *Jul. 18, 2017

(54) EFFICIENT ENCRYPTION, ESCROW AND DIGITAL SIGNATURES

(71) Applicant: AUTHENTIFY, INC., Chicago, IL (US)

(72) Inventor: Ravi Ganesan, West Palm Beach, FL (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,046

(22) Filed: Aug. 25, 2015

(65) Prior Publication Data

US 2015/0381608 A1     Dec. 31, 2015

Related U.S. Application Data

(63) Continuation of application No. 13/799,162, filed on Mar. 13, 2013, now Pat. No. 9,148,449.

(51) Int. Cl.
    | | |
    |---|---|
    | *H04L 29/06* | (2006.01) |
    | *H04L 9/08* | (2006.01) |
    | *H04L 9/32* | (2006.01) |

(52) U.S. Cl.
    CPC ........ *H04L 63/0823* (2013.01); *H04L 9/0825* (2013.01); *H04L 9/0894* (2013.01);
    (Continued)

(58) Field of Classification Search
    None
    See application file for complete search history.

(56) References Cited

U.S. PATENT DOCUMENTS

| 5,557,678 A | 9/1996 | Ganesan |
|---|---|---|
| 7,499,551 B1 | 3/2009 | Mire |

(Continued)

OTHER PUBLICATIONS

Feng, H. and Wah, C. "Private Key Generation from On-line Handwritten Signatures. Information management and computer security" [online], 2002 [retrieved on Nov. 14, 2015]. Retrieved from the Internet< URL: http://www.cse.lehigh.edu/prr/Biometrics/Archive/Papers/PrivateKeyGenerationFromSigs.pdf >.*

*Primary Examiner* — Malcolm Cribbs
(74) *Attorney, Agent, or Firm* — Kilpatrick Townsend & Stockton LLP

(57) ABSTRACT

A network server is operated so as to facilitate legal eavesdropping by receiving, from the first user via a network, a session key (SK) encrypted with a second user's public key, $k_{pubU2}$, and the SK encrypted with an escrow server's (ES) public key, $k_{pubES}$. The $k_{pubU2}$ key is the public key of the second user asymmetric private/public key pair $k_{priU2}/k_{pubU2}$. The $k_{pubES}$ key is the public key of the ES asymmetric private/public key pair $k_{priES}/k_{pubES}$. The received SK encrypted with $k_{pubES}$ is stored. The SK encrypted with $k_{pubU2}$ is transmitted to the second user via the network. A message encrypted with the SK is received from one of the first and the second users via the network, stored, and transmitted to the other of the first and the second users via the network.

4 Claims, 4 Drawing Sheets

(52) U.S. Cl.
CPC ......... *H04L 9/3247* (2013.01); *H04L 63/045* (2013.01); *H04L 63/0876* (2013.01); *H04L 63/30* (2013.01)

(56) References Cited

U.S. PATENT DOCUMENTS

| | | | |
|---|---|---|---|
| 2002/0150241 A1* | 10/2002 | Scheidt | H04L 9/321 380/44 |
| 2003/0163697 A1* | 8/2003 | Pabla | H04L 9/0838 713/171 |
| 2004/0139314 A1* | 7/2004 | Cook | G06Q 10/107 713/151 |
| 2005/0169476 A1* | 8/2005 | Little | H04L 12/58 380/255 |
| 2006/0047960 A1* | 3/2006 | Ono | H04L 9/0825 713/171 |
| 2006/0212703 A1* | 9/2006 | Kojima | G06Q 20/3674 713/175 |
| 2006/0219776 A1* | 10/2006 | Finn | B60R 25/25 235/380 |
| 2007/0016785 A1* | 1/2007 | Guay | H04L 9/3236 713/176 |
| 2009/0016526 A1 | 1/2009 | Fiatal et al. | |
| 2009/0182668 A1 | 7/2009 | Lee | |
| 2012/0124384 A1* | 5/2012 | Livni | H04L 9/3247 713/178 |
| 2012/0131333 A1* | 5/2012 | Zhang | H04L 9/0825 713/156 |
| 2012/0272064 A1 | 10/2012 | Sundaram et al. | |
| 2013/0182841 A1 | 7/2013 | Buckley et al. | |
| 2013/0191631 A1* | 7/2013 | Ylonen | H04L 63/1483 713/153 |
| 2013/0236019 A1 | 9/2013 | Zaverucha et al. | |
| 2014/0325672 A1 | 10/2014 | Galwas | |

\* cited by examiner

EFFICIENT ENCRYPTION, ESCROW AND DIGITAL SIGNATURES

RELATED APPLICATION

This application a continuation of U.S. patent application Ser. No. 13/799,162, filed Mar. 13, 2013, the entire contents of which are incorporated herein by reference.

ENCRYPTION BACKGROUND

Encryption mechanisms can be classified into two varieties. First, two parties can agree on a session key and use that session key, SK, for encryption for the duration of the session. That is, the duration of what may be characterized as a continuous or ongoing session. This mechanism is typically used for session oriented communications, for instance between a client and a server, or between a browser and a web server. Here the party sending the first message will generate a fresh session key (SK) that will be used to encrypt all messages during the session using symmetric encryption techniques, and then "envelope" this SK using asymmetric cryptography. For instance, using private/public key infrastructure, the encryption can be performed by encrypting the SK using the public key of the other party or entity.

The second mechanism is typically used for storing and forwarding individual communications such as an email or text message. Here the party sending the message (say an email), will generate a fresh session key, or what is better characterized as a single message session key, SMSK, encrypt the message using symmetric encryption techniques, and then "envelope" the message key SMSK for that message using asymmetric cryptography. For instance, using private/public key infrastructure, the encryption can be performed by encrypting the SMSK for that message using the public key of the recipient.

Messaging applications, such as texting, fall into the email style store and forward paradigm. That is, there is no continuous session between the two parties. However, using the second mechanism described above to generate a SMSK per text message can be quite costly, particularly in view of the fact that asymmetric cryptography is inherently inefficient. Furthermore, with devices, such as smartphones, it is beneficial to conserve battery power as much as possible. Generating a SMSK per email or text message will often require generating numerous SMSKs over short periods of time, and hence the expenditure of significant battery power that time period.

Accordingly, a need exist for a more efficient mechanism for encrypting text messages.

Whenever end to end encryption, such as what is described above is achieved, it raises the concern that the communications cannot be viewed by a third party. In fact, the main purpose of all types of SKs, including SMSKs, is to ensure that no third party can see the information being communicated. Yet, in practice there are always legitimate third parties who have a legitimate interest in seeing the messages without the consent of either the sender or the intended recipient.

Two commonly accepted requirements essentially define key escrow systems. First the system should provide an authority the ability to access encrypted information without the cooperation of the participants. Second, the "backdoor" inherent in the system should not be usable by an unauthorized third party. Although the additional requirements discussed in the following paragraphs are important, they are not necessarily commonly accepted.

Authorities should have access only to short term session keys, not to long-term user secrets. In most cryptographic systems, each user has a long-term private secret. In public-key cryptography, this would be the user's private key. In a third-party authentication system, this would be the long-term secret shared between the user and the third-party server. For communications security, these long-term private secrets are typically used to negotiate, i.e. secure, a relatively short-lived session key that is exchanged between the parties and in turn is used for encrypting a given session or conversation, i.e. for encrypting the message or messages communicated during the session.

If a legitimate authority seeks to eavesdrop on a conversation, one of two things can happen. One alternative is for the key escrow system to allow the authority to discover the user's long-term private secret, through which the authority can learn the session key for a given conversation and proceed to eavesdrop. Another alternative is for the key escrow system to allow the authority to discover the session key for a particular conversation, but not the long-term private secret. The authority can still eavesdrop successfully, but the long-term private secret is safe.

It will be preferable for key escrow systems to be designed around the latter approach of revealing only short-lived session keys. This is important for several reasons.

First, since the long-term private secret is never revealed to anyone, it can be reused for other functions, such as digital signatures. In systems in which an authority can access this long-term secret, reusing the long-term private secret to generate digital signatures gives the authority the power to forge signatures.

Second, revealing only session keys provides a finer level of granularity of control. For instance, in such systems, one could implement policies such as (i) the authority can eavesdrop on all of John Doe's conversations, except those he has with his wife or lawyer, or (ii) the authority can decrypt all of John Doe's files saved between March 1994 and September 1994, but not files saved before or after those dates.

Escrow systems represent a compromise between an individual's right to privacy and an authority's right to eavesdrop. Revealing session keys—as opposed to long term private secrets—provides more opportunities for compromise. This is because the compromise is not permanent. That is, in systems in which long-term private secrets are revealed, the compromise of the user's secret is permanent. At some point, the user must get a new long term private secret, e.g. a new private key, or if the secret is embedded in a chip in a cellular or smart phone or other smart device, a new chip. On the other hand, revealing session keys does not compromise the long-term integrity of the permanent secret. So, once the period of "legal eavesdropping" is over, the user does not have to be issued a new private key or other type of long term private secret.

A brute force approach to escrow within an end to end encryption mechanism as described above, would be to archive the secret, e.g. the private key, for each user. As described above, this is taking an axe to a problem which requires a chisel. A far more sensible approach would be to escrow only the session keys. Another approach would be to give the power of escrowing the session keys to the server in the cloud that mediates the session key exchange in the first place. This unfortunately results in the compromise of that single service becoming catastrophic.

Accordingly, a need also exist for an improved escrowing technique.

Closely related to encryption and escrow is the concept of digital signatures.

Conventional techniques for performing digital signatures have been around for a very long period of time, but are still seldom used. The primary obstacle has to do with the end user complexity which implementations of digital signatures entail. In the meantime however, the use of graphical signatures has grown by leaps and bounds, and consumers are now very accustomed to creating a graphical signature at a check out register in supermarkets and other such retail locations. However, since a graphical signature can be perfectly copied and pasted it lacks the additional assurance that can be provided by digital signatures.

Accordingly, a need also exist for an improved technique for performing digital signatures.

SUMMARY OF INVENTION

To solve at least some of the above noted deficiencies, in accordance with aspects of the invention a network server, such as a messaging server in the cloud, can be operated so as to facilitate legal eavesdropping, such as eavesdropping by authorized local, state or federal law enforcement agencies. Using standard techniques, a first user obtains via a network, such as the Internet, and stores an escrow server (ES) certificate, where the ES certificate includes $k_{pubES}$, which is the public key of the ES asymmetric private/public key pair $k_{priES}/k_{pubES}$.

Preferably, the ES certificate is signed with the private key, $k_{priCA}$, of a trusted certificate authority (CA). It will be recognized that $k_{priCA}$ is the private key of the CA asymmetric private/public key pair $k_{priCA}/k_{pubCA}$. In such a case, the first user can apply the public key, $k_{pubCA}$, of the CA to verify the signature on the ES certificate.

A session key (SK) encrypted with a second user's public key, $k_{pubU2}$ and the SK encrypted with $k_{pubES}$ are received by the network server from the first user via the network. Here also, it will be recognized that $k_{pubU2}$ is the public key of the second user asymmetric private/public key pair $k_{priU2}/k_{pubU2}$. The received SK encrypted with $k_{pubES}$ is stored so as to be accessible to the network server. The SK encrypted with $k_{pubU2}$ is transmitted by the network server to the second user via the network. A message encrypted with the SK is received by the network server from one of the first and the second users via the network, stored so as to be accessible to the network server, and transmitted by the network server to the other of the first and the second users via the network.

After receiving a request from a legitimate authority, the stored SK encrypted with $k_{pubES}$ and the stored the received message encrypted with SK are transmitted by the network server to an authorized eavesdropper.

If the above message is a first email or text message, beneficially the SK can also be used to encrypt other messages between these same users. For example, a second email or text message encrypted with the same SK may also be received by the network server from one of the two users via the network, stored, and transmitted to the other of the users via the network.

According to other aspects of the invention, a user's smart communication device can be operated to securely communicate emails or text messages to another user via a network, such as the Internet. To do so, another user's certificate is retrieved from a network server, such as a messaging server in the cloud. The other user's certificate includes $k_{pubOU}$, which is the public key of the other user private/public asymmetric key pair $k_{priOU}/k_{pubOU}$. A session key (SK) is created by the user's device for communications between the user of the device and the other user, and is stored, in some type of data store, e.g. hard disk, removable disk, or memory, which is typically installed within the device. The SK is also encrypted with the other user's public key, $k_{pubOU}$, from the retrieved certificate and transmitted to the other user via the network server. A first email or text message encrypted with the SK is transmitted to the other user via the network server. A second email or text message encrypted with the same SK is received from the other user via the network server, and decrypted with the stored SK.

In accordance with still other aspects of the invention, a user's smart communication device, such as a smart phone, which includes a touchpad, is operated to graphically and digitally sign messages. To do so, a private/public asymmetric key pair, $k_{priU}/k_{pubU}$, for the user is automatically generated by the device, transparent to the user. It will be recognized that $k_{priU}$ is the private key and $k_{pubU}$ is the public key of the user asymmetric private/public key pair.

The user's public key, $k_{pubU}$, is transmitted by the device to a trusted Certificate Authority (CA) via a network. In return, a certificate, including $k_{pubU}$, signed with the private key, $k_{priCA}$, of the CA, is received by the device from the CA via the network. Here also, it will be recognized that $k_{priCA}$ is the private key of the CA asymmetric private/public key pair, i.e. $k_{priCA}/k_{pubCA}$.

A request to sign a message is received by the device from another user via the network. A user input corresponding to a graphical signature of the user is received via the touchpad. In response to receipt of the user input, the message is automatically digitally signing with $k_{priU}$. The graphical signature, the digitally signed message and the signed certificate are then transmitted by the device to the other user via the network, e.g. the Internet.

It should be understood that the above described aspects of the invention can be implemented using logic, for example in the form of software, such as a programmed application or app, stored on non-transitory storage medium, such as a hard, compact or other type disk, or memory, which is configured to be readable by a processor and thereby cause the processor to operate so as to perform the functions and/or operations described above. It should also be understood that the above described aspects of the invention can be implemented on the network server or smart communications device, as applicable, having a processor configured with the logic to perform the functions and/or operations described above and a data store, e.g. disk or memory, configured to store data as directed by the processor.

Additional objects, advantages, novel features of the present invention will become apparent to those skilled in the art from this disclosure, including the following detailed description, as well as by practice of the invention. While the invention is described below with reference to particular embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

DETAILED DESCRIPTION OF INVENTION

Improved Encryption Technique

To address the above noted and other deficiencies in current encryption mechanisms, an innovative hybrid approach is utilized. In accordance with this approach and referring to FIG. 2, when Alice wishes to communicate with Bob, she retrieves, in 201, Bob's certificate, i.e. $Cert_B$, from a server in the cloud, in 202, where Bob's certificate includes $k_{pubB}$, which is the public key of Bob's private/public asymmetric key pair $k_{priB}/k_{pubB}$. She also creates, in 203, a new session key (SK), for communications between Alice and Bob, envelopes the session key, in 204, with Bob's public key, i.e. encrypt [SK] $k_{pubB}$, and sends it to him, in 207, via the server in the cloud, which will be referred to below as cloud server (CS). When Bob's device, e.g. smartphone, is on-line, it retrieves the envelope, decrypts it, in 211, with his private key, i.e. decrypt [encrypted SK] $k_{priB}$, to obtain the SK and stores the SK. From this point on, all future messages, e.g. email and/or text messages, between Alice and Bob are encrypted and decrypted, in 206 and/or 212, using this SK, e.g. encrypt [text message] SK and decrypt [encrypted message] SK.

A new session key is only needed when Alice or Bob change their certificate, e.g. in 201, and event that could, for example, be triggered by their logging off and logging back in to their messaging, e.g. email or texting, clients on their smartphone. For example, if Bob logs offs and then logs back in to his messaging client, Alice will need to create a new session key, SKnew, as in 203, envelope the new session key with Bob's public key, i.e. encrypt [SKnew] $k_{pubB}$, as in 204, and send it to him via the CS, as in 207. When Bob's device, e.g. smartphone, is on-line, it retrieves the envelope, decrypts it with his private key, i.e. decrypt [encrypted SKnew] $k_{priB}$, as in 211, to obtain the SKnew, and stores the SKnew. From this point on, all future messages, e.g. email and/or text messages, between Alice and Bob are encrypted and decrypted using this SKnew, e.g. encrypt [text message] SKnew and decrypt [encrypted message] SKnew, as in 206 and/or 212.

This hybrid approach does not require both parties to be on-line at the time of key exchange, and avoids the usual semantics associated with "sessions", e.g. session keys vs. single message session keys. Yet, by reusing the session key SK, rather than the conventional single message session key, SMSK, it also avoids the inefficiency of generating new keys for each message, enveloping (encrypting) these keys, and decrypting these envelopes with these new keys.

As described above, the invention provides a more efficient mechanism for encrypting text messages without generating a session key per email or text message. It thereby avoids the need to generate numerous single message session keys, SMSKs, over short periods of time, which can require the expenditure of significant battery power.

Improved Escrowing Technique

Figure 1:
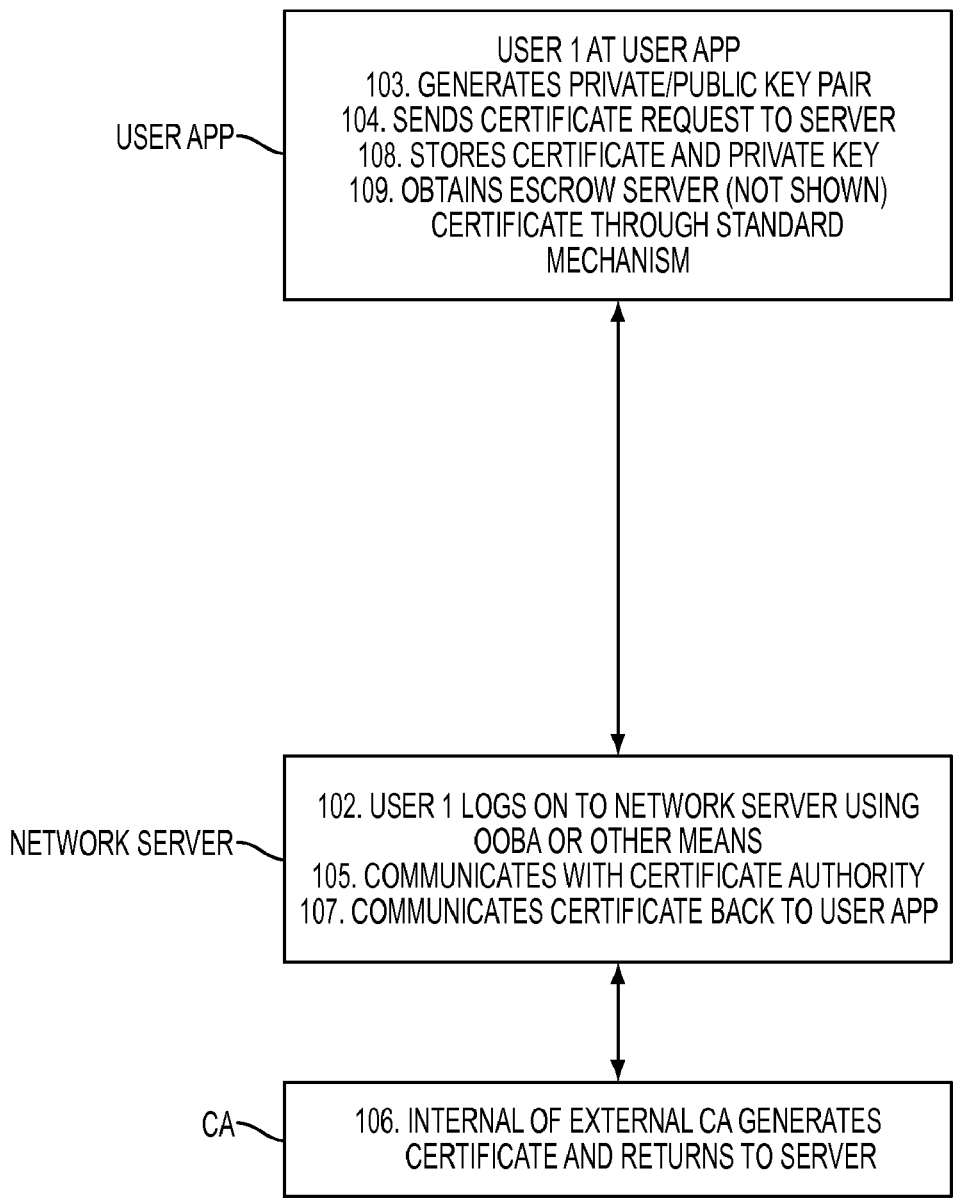
FIG. 1 depicts key generation in accordance with the present invention.
Figure 2:
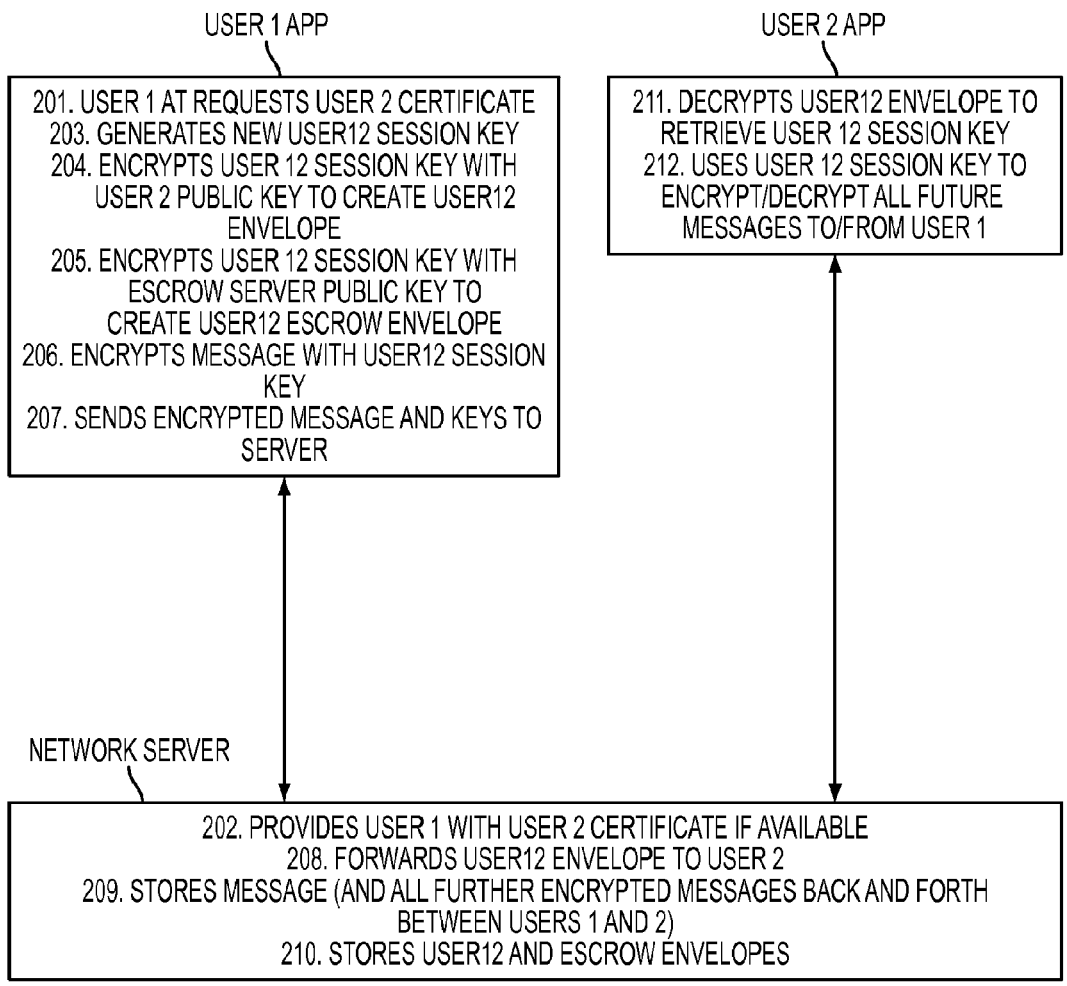
FIG. 2 depicts key exchange in accordance with the present invention.

To address the above noted and other deficiencies in conventional escrowing techniques, and referring now to FIGS. 1-2, at the time of creating the local asymmetric private/public key pair, in 103, and interacting, in 105, with a trusted Certificate Authority (CA) via the CS, in 102, to create a certificate (which typically happens at login of the user using the user client), in 106, which includes the user's public key $k_{pubU}$ and is sent back to the client, in 109, and stored with the user's private key $k_{priU}$, where $k_{priU}$ is the private key of the user asymmetric private/public key pair $k_{priU}/k_{pubU}$, in 108, the messaging software (which is being executed on the user's smartphone or other smart communications device) retrieves via the CS, or otherwise obtains, in 109, the escrow server (ES) certificate, i.e. $Cert_{ES}$, where the ES certificate includes $k_{pubES}$, which is the public key of the ES asymmetric private/public key pair $k_{priES}/k_{pubES}$. Preferably, the user obtains the ES certificate in a secure fashion. There are a number of ways of achieving this, which are well understood by those skilled in the art. The obtained ES certificate is preferably signed by the CA, i.e. sign [$Cert_{ES}$] $k_{priCA}$, where $k_{priCA}$ is the private key of the CA asymmetric private/public key pair $k_{priCA}/k_{pubCA}$. The messaging software verifies the signature on the ES certificate by applying the CA's public key, $k_{pubCA}$, to the signed ES certificate, i.e. apply [signed $Cert_{ES}$] $k_{pubCA}$, and, after verifying the signature, stores the ES certificate, $Cert_{ES}$, locally.

Each time Alice begins to communicate with a new user, in addition to enveloping the applicable session key, SK, with the recipient's (say Bob) public key, as in 204, she also envelops it, in 205, with the ES's public key, $k_{pubES}$, from the stored ES certificate. Thus, the session key is encrypted with both Bob's public key, $k_{pubB}$, and the ES's public key, $k_{pubES}$, i.e. encrypt [SK] $k_{pubB}$ and encrypt [SK] $k_{pubES}$.

Alice sends, in 207, the enveloped session key, i.e. the SK encrypted with $k_{pubES}$ and the SK encrypted with $k_{pubB}$, to Bob via the CS. The CS captures and stores the SK encrypted with $k_{pubB}$ and the SK encrypted with $k_{pubES}$, in 210, and sends, i.e. forwards, only the SK encrypted with $k_{pubB}$ to Bob, in 208. From this point on, all future messages, e.g. email and/or text messages, between Alice and Bob are encrypted using this session key SK, e.g. encrypt [message] SK. The CS also stores a copy of each of these encrypted messages, in 209. Thus, the CS stores the messages encrypted with SK, as well as the session key encrypted with the ES's public key, $k_{pubES}$ from the escrow certificate and with Bob's $k_{pubB}$ from Bob's certificate. None of these can be decrypted by the CS, because it lacks access to the SK to decrypt the messages, and to the ES's private key, and to Bob's private key, to decrypt the SK.

Figure 3:
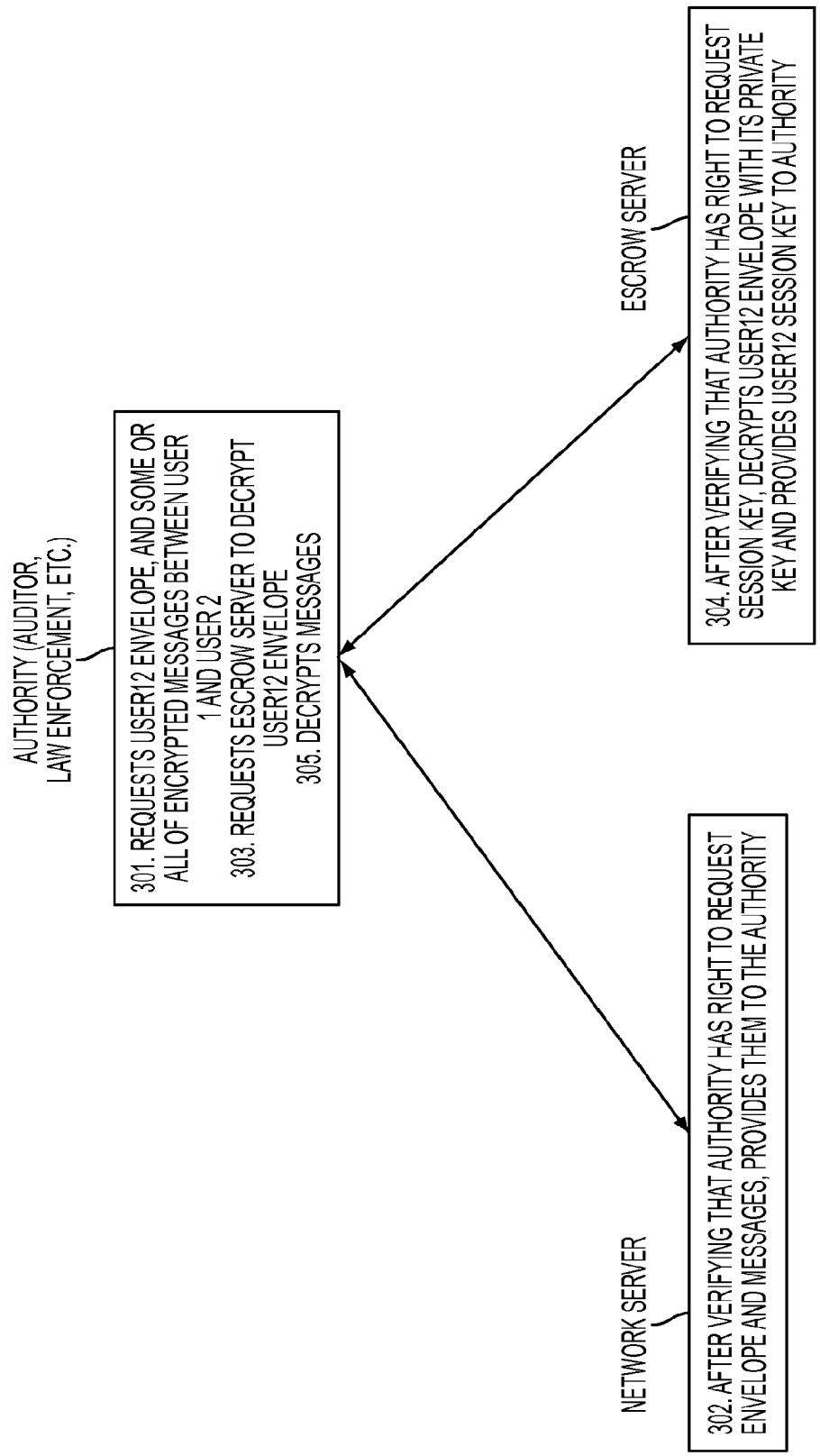
FIG. 3 depicts key escrow in accordance with the present invention.

In the event that a legitimate $3^{rd}$ party, such as local, state or federal law enforcement, needs to see one or more of the messages communicated between Alice and Bob, as shown if FIG. 3, it asks, in 301, the CS for the applicable encrypted message(s) and the applicable encrypted SK. After verifying the legitimacy of the request, the CS provides this information to the $3^{rd}$ Party, in 302.

The $3^{rd}$ Party then presents, in 303, the applicable encrypted SK to the ES, which after verifying the legitimacy of the $3^{rd}$ Party, decrypts the applicable SK with it's private key $k_{priES}$, by performing decrypt [encrypted SK] $k_{priES}$, and provides the applicable SK to the $3^{rd}$ Party, in 304. The $3^{rd}$ Party can now, in 305, decrypt the message(s) communicated between Alice and Bob that were encrypted with the SK by performing decrypt [encrypted message] SK. It will be recognized by those skilled in the art that while this technique has been described in terms of "escrow", it can also be used for backup and recovery.

As described above, the invention provides an improved escrowing technique that gives an authority the ability to access encrypted information without the cooperation of the participants. The improved technique limits the authority's access to only relatively short term session keys. Accordingly, third party access to encrypted information can be provided without revealing a user's long-term private secret, thereby allowing the long-term private secret to continue to be used for other functions, such as digital signatures, even after eavesdropping is authorized. Thus, once the period of "legal eavesdropping" is over, the user does not have to be issued a new private secret. Additionally, the technique allows for a finer level of granularity of control. For instance, using the technique, one could implement policies such as (i) the authority can eavesdrop on all of John Doe's conversations, except those he has with his wife or lawyer, or (ii) the authority can eavesdrop on all of John Doe's files saved between March 1994 and September 1994, but not files saved before or after those dates. The technique prevents the escrow agent from gaining any access to the actual message stream.

Improved Digital Signature Technique

To address the above noted and other deficiencies in conventional digital signature techniques, a new type of digital signatures is not required. Rather, what is required is improvement over convention art that actually makes digital signatures usable. The technique described below allows the intuitive simplicity of graphical signatures to be married to digital signatures.

More particularly, in accordance with this aspect of the invention, transparent to the user, a private/public asymmetric key pair for the user, i.e. $k_{priU}/k_{pubU}$, where $k_{priU}$ is the private key and $k_{pubU}$ is the public key of the user asymmetric private/public key pair, is automatically generated at the messaging client being executed on the user's smartphone or other smart communications device, and the public key, $k_{pubU}$, is sent to a trusted Certificate Authority (CA) which sends back a signed user certificate that includes the user's public key, $k_{pubU}$, e.g. sign [Cert] $k_{priCA}$, where $k_{priCA}$ is the private key of the CA asymmetric private/public key pair, i.e. $k_{priCA}/k_{pubCA}$.

Figure 4:
FIG. 4 depicts an exemplary graphical interface which can be used to facilitate digital signatures in accordance with the present invention.

When a "sign message" request is sent to the user, say Alice, at her messaging client, she is asked to use the touchpad built into most modern smartphones, other smart mobile communications devices, and also some other smart communications devices, to create a graphical signature. This is a simple interface she is very familiar with and poses no usability obstacles, as shown in FIG. 4. Behind the scenes however, the message (and response) is being automatically digitally signed using her private key, $k_{priA}$, where $k_{priA}$ is the private key of Alice's asymmetric private/public key pair $k_{priA}/k_{pubA}$, and the graphical signature and digital signature, i.e. sign[message]$k_{priA}$ are sent back to the sender via the CS.

The CS can optionally perform the step of verifying the digital signature (as long as it is not encrypted, e.g. with a session key), i.e. by applying Alice's public key to the signed message, e.g. apply [signed message] $k_{pubA}$, thereby saving the sender of the message from having to perform this verification step.

In any event, the CS forwards the signed message, sign [message] $k_{priA}$, and Alice's signed certificate, sign [Cert$_A$] $k_{priCA}$, which includes Alice's public key, $k_{pubA}$, to the sender. The sender can also then verify Alice's public key, $k_{pubA}$, by first verifying the CA's signature using the CA's public key, $k_{pubCA}$, i.e. apply [signed Cert$_A$] $k_{pubCA}$, and can, if desired, verify Alice's digital signature by applying Alice's public key, $k_{pubA}$, which is retrieved from Alice's Cert, Cert$_A$, to the digitally signed message, e.g. apply [signed message] $k_{pubA}$.

Using this technique, the digital signing is kept incredibly simple for the Alice (and even the recipient) while achieving the high security and non-repudiation digital signatures provide.

As described above, the invention provides an improved technique for performing digital signatures, which eliminates end user complexity and marries graphical signatures with digital signatures to enhance signature assurance.

I claim:

1. A method of operating a user smart communication device to securely communicate email or text messages to another user via a network, comprising:

retrieving, from a network server, the other user's certificate, where the other user's certificate includes $k_{pubOU}$, which is the public key of the other user's private/public asymmetric key pair $k_{priOU}/k_{pubOU}$;

creating a session key (SK) for securing communications between the user and the other user;

storing the SK;

encrypting the SK with the other user's public key, $k_{pubOU}$;

encrypting the SK with an escrow public key $k_{pubES}$ received from an escrow server;

transmitting, to the network server, the SK encrypted with the other user's public key $k_{pubOU}$ and the SK encrypted with the escrow public key $k_{pubES}$, for forwarding the SK encrypted with the other user's public key $k_{pubOU}$ to the other user via the network server and for storing the SK encrypted with the escrow public key $k_{pubES}$ at the network server, the stored SK encrypted with the escrow public key $k_{pubES}$ being accessible at the network server for transmission to an authorized eavesdropper for decrypting messages between the user and the other user;

transmitting, to the other user via the network server, a first email or text message encrypted with the SK;

receiving, from the other user via the network server, a second email or text message encrypted with the SK; and decrypting the received encrypted second message with the stored SK.

2. The method of operating a user smart communication device according to claim 1, further comprising:

receiving, from an escrow server, a certificate, including the escrow public key $k_{pubES}$; and retrieving the escrow public key $k_{pubES}$ from the certificate received from the escrow server.

3. A method of operating a user smart communication device to securely communicate email or text messages to another user via a network, comprising:

retrieving, from a network server, the other user's certificate, where the other user's certificate includes $k_{pubOU}$, which is the public key of the other user's private/public asymmetric key pair $k_{priOU}/k_{pubOU}$;

creating a session key (SK) for securing communications between the user and the other user;

storing the SK;

encrypting the SK with the other user's public key, $k_{pubOU}$;

encrypting the SK with an escrow public key $k_{pubES}$ received from an escrow server;

transmitting, to the network server, the SK encrypted with the other user's public key $k_{pubOU}$ and the SK encrypted with the escrow public key $k_{pubES}$, for forwarding the SK encrypted with the other user's public key $k_{pubOU}$ to the other user via the network server and for storing the SK encrypted with the escrow public key $k_{pubES}$ at the network server, the stored SK encrypted with the escrow public key $k_{pubES}$ being accessible at the network server for transmission to an authorized eavesdropper for decrypting messages between the user and the other user; and transmitting, to the other user via the network server, a first email or text message encrypted with the SK.

4. The method of operating a user smart communication device according to claim 3, further comprising:

receiving, from an escrow server, a certificate, including the escrow public key $k_{pubES}$; and retrieving the escrow public key $k_{pubES}$ from the certificate received from the escrow server.

* * * * *